2,997,055
FLUID DISTRIBUTION VALVES
Carl H. Cadonau and Lester E. Peik, both of 6149 SW. Shattock Road, Portland, Oreg.
Filed July 29, 1958, Ser. No. 751,778
7 Claims. (Cl. 137—240)

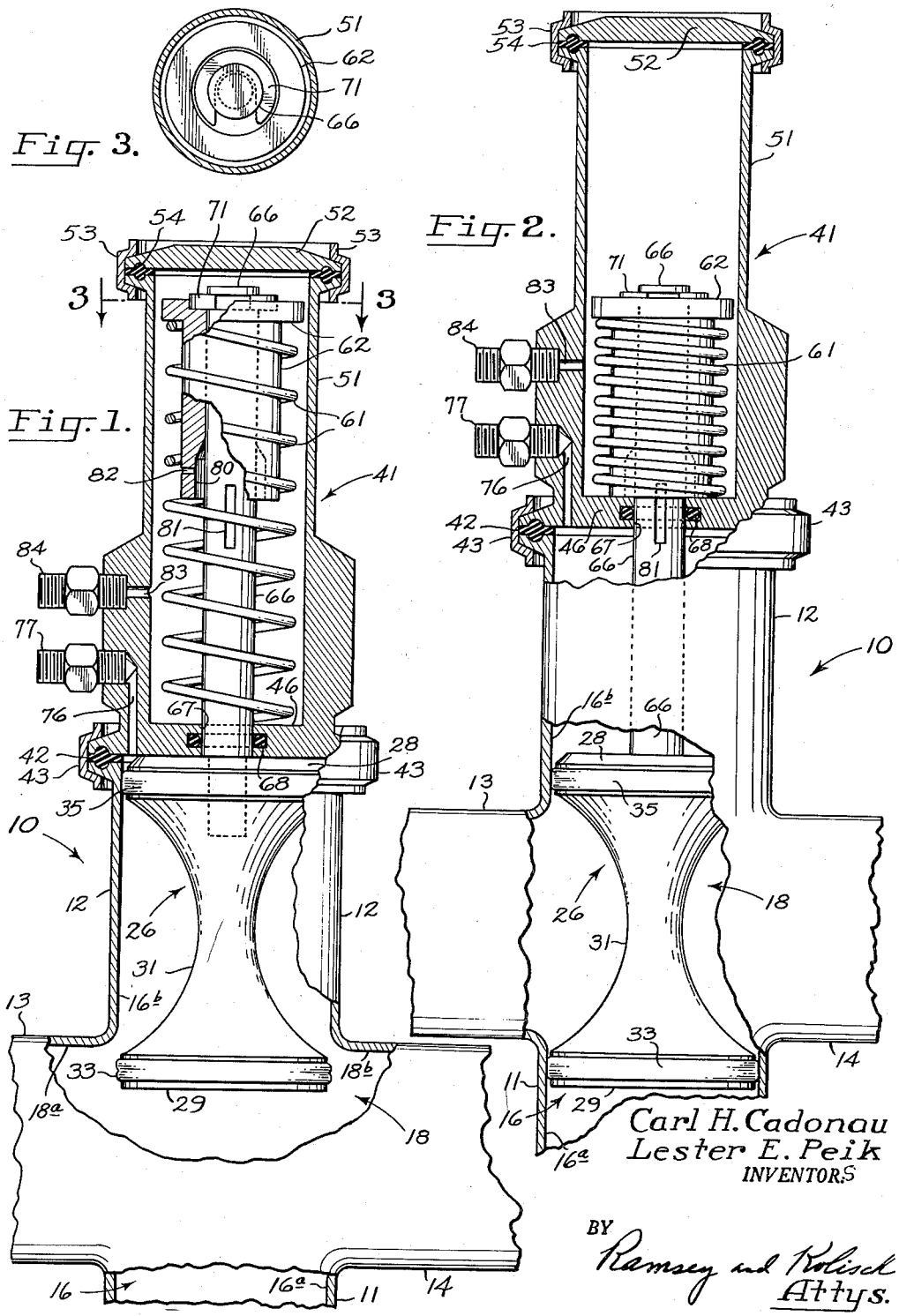

This invention relates to fluid distribution valves, and more particularly to an improved distribution valve which may be cleaned, readily and thoroughly, by directing a cleaning solution through the fluid conduits controlled by the valve, and which as a consequence has particular utility in industries where contamination of the fluid handled is a problem.

An object of the invention is to provide an improved fluid distribution valve having a sliding type valve element movable between positions open and closing a conduit, wherein the valve element is so constructed that it may be positioned to require a cleaning solution to swirl completely over the surfaces wetted by the fluid handled.

Another object is to provide a fluid pressure actuated valve which has novel indicator means for indicating the position of the valve. The indicator means can be employed to actuate a remote signalling device, and therefore render the valve useful in constructions where a valve is remotely controlled.

In general terms, the valve of this invention comprises a valve casing having wall portions defining a pair of intersecting passages. Slidably mounted for reciprocating in one of the passages is a valve element or spool of hourglass configuration. The valve spool has enlarged end portions, which are joined by an elongated stem portion extending between the valve spool ends.

The valve element is mounted in the one passage with one of its ends moving up and down in a portion of the passage located on one side of the other passage. This portion functions as a mounting chamber. A sealing ring around this one end provides a sealing fit with the walls of the mounting chamber. The other end of the valve element is movable between a closing position closing the portion of the one passage which is located on the opposite side of the other passage, and an opening position located intermediate the two passage portions. The valve element or spool has a length exceeding the width of the other passage, and thus in both of the positions one end of the valve element remains at all times in sealing engagement with the walls of the mounting chamber. The hourglass configuration of the valve element enables liquid to pass around the other end when the valve element is in an opening position and swirl against the walls of the mounting chamber thereby to clean the same. The result is a valve which is substantially free of any surface areas which can collect contaminating fluid.

The valve has considerable importance in such industries as the dairy industry. In dairies, extreme cleanliness is necessary in order to reduce to a minimum bacterial proliferation. Conduits handling milk must be cleaned continuously, and the ordinary valve, to be thoroughly cleaned, must be taken apart. Obviously, a valve which can be adequately cleaned without dismantling has considerable utility.

A more specific object of the invention, therefore, is to provide a distribution valve which has a valve element controlling the flow of fluid therethrough, wherein the valve element has two ends, one for opening and closing a conduit and the other providing a seal with the mounting chamber mounting and the valve element and wherin the valve element also has a diminished center portion or stem connecting the ends accommodating, when the valve element is appropriately positioned, the flow of fluid around the body of the valve and the flow of fluid over the walls of the mounting chamber.

Another object of the invention is to provide a distribution valve of this description, wherein the valve element has an hourglass configuration so that the flow of fluid around the valve element and over the mounting chamber walls is over substantially all the areas touched by fluid during operation of the valve. The hourglass shape is also important in that it produces minimal disturbance in any fluid flowing past the valve element. The valve element thus can be used in the control of fluid in a three-branch conduit system.

A still further object is to provide a valve having a primary valve element which is actuated by an air pressure operated expansion chamber to move in one direction, and spring biased to move in the opposite direction, and which also includes a bleeder valve mechanism actuated by the primary valve element, the bleeder valve mechanism having a port which connects with the expansion chamber to enable the bleeding of air from the expansion mechanism in one position of the primary valve element. This bleeding of air may be employed to actuate a remote signal system.

Further objects and advantages are attained by the invention, which is described hereinbelow in conjunction with the accompanying drawings, wherein:

FIG. 1 is a view of a valve mechanism constructed according to this invention, partially broken away to illustrate details, and showing the mechanism in one position;

FIG. 2 is a view similar to FIG. 1 but illustrating the valve mechanism in another position; and FIG. 3 is a section view along the line 3—3 in FIG. 1.

Referring now to the drawings, 10 indicates generally a valve casing of cruciform shape having four legs, indicated at 11, 12, 13 and 14. Casing 10 has a hollow interior, and the inner walls of the casing define a pair of elongated passages 16, 18 extending through the casing and intersecting each other. Passage 16 extends along the interior of legs 11 and 12 and comprises two parts, one on each side of passage 18 and designated 16a and 16b respectively. Similarly, passage 18 extends along the interior of legs 13 and 14 and comprises parts designated 18a and 18b respectively.

In the embodiment illustrated and discussed herein, passage portion 16a, 18a and 18b constitute courses for the flow of fluids controlled by the valve mechanism. Fluid flows either through all three courses, for one position of the valve, or through the courses provided by portions 18a and 18b for the other position of the valve.

Slidably mounted for reciprocation to and fro in passage portion 16b (which constitutes a mounting chamber for the valve) is a valve element 26. The valve element is of hourglass configuration, and comprises a valve body having a pair of enlarged ends 28, 29, and a stem portion 31 connecting ends 28, 29. Ends 28, 29 are each provided with an annular groove extending around the perimeter thereof, which seats a sealing ring. The rings are indicated at 33, 35. Each sealing ring and the enlarged end mounting the ring at each end of the valve element constitute a valve closure head in the device.

Casing 10 includes a bonnet 41 separable from the lower portion of the casing but securely attached thereto over the top end of leg 12. Bonnet 41 is sealed to the top end of leg 12 by a seal 42, and is fastened in place on the top of leg 12 by a clamp 43. Clamp 43 is tightened over cooperating flanges presented by leg 12 and the lower end of bonnet 41 by a buckle (not shown).

Bonnet 41 has a base wall 46 closing the upper end of leg 12 which defines the upper limit position for valve element 26. This upper limit is best illustrated in FIG. 1 and is determined by the upper end of valve element 26 abutting base wall 46.

The valve element has a length slightly exceeding the width of passage 18. The valve element is movable from the upper limit position illustrated in FIG. 1 to the lowered or closing position shown in FIG. 2.

In the lowered position the valve element spans the wall portions defining passage 18, and the closure heads at each end of the valve element are each sealingly fitted into portions of passage 16. This is shown in FIG. 2 wherein the upper closure head is sealingly fitted in passage portion 16b. In the lowered position of FIG. 2, fluid is free to flow between passage portions 18a, 18b but is prevented from flowing down into passage portion 16a.

In the retracted or upper position of FIG. 1, which is the opening position, the lower closure head is held intermediate passage portions 16a, 16b, and fluid may flow around the end of the lower closure head into passage 16b. In the retracted position for the valve, the entire inside of passage or mounting chamber 16b is opened up and may be washed out by suitable detergent passed through the conduits. In this position, all three passages 18a, 18b, and 16a are opened up.

A pressure fluid actuated expansion chamber and bias means are provided for moving the valve element between its opening and closing positions. Specifically, bonnet 41 has a cylindrical wall portion 51 above base wall 46 which defines an elongated cylindrical cavity. Closing off the top of the cavity is a cap 52. The cap is secured to wall 51 by means of a clamp 53 and a seal 54 similar to clamp 43 and seal 42.

Mounted within the cavity is an elongated coil compression spring 61. This has its upper end seated against a flanged retainer member 62. The lower end of coil spring 61 abuts the top face of wall 46.

Affixed to valve element 26 and thus movable conjointly therewith is an elongated valve rod 66. Rod 66 extends upwardly through a bore 67 provided in wall 46 and terminates at a point proximate cap 52 when the valve is in the raised position of FIG. 1. A seal 68 mounted in wall 46 and encircling rod 66 prevents leakage along the rod through wall 46.

The upper end of valve rod 66 is secured to the retainer member by an open ring member 71. Member 71 fits into an accommodating groove formed in the upper end of the valve rod. Coil spring 61 urges the retainer member upwardly against ring member 71. The coil spring, by urging the retainer member and the valve upwardly, constantly biases the valve element to the raised position shown in FIG. 1.

Extending through base wall 46 of the bonnet is an elongated air feed and exhaust passage 76. Passage 76 connects at its upper end with the central bore of a fitting 77, which is externally threaded. Pressurized air when admitted through fitting 77 and passage 76 exerts a pressure on the upper face of end 28, and moves the valve element downwardly against the biasing action of spring 61. The upper face of end 28 and lower face of wall 46 constitute portions of the expansion chamber for actuating the valve. Movement of the valve element downwardly is limited by the base of retainer member 62 striking the upper face of base wall 46. Thus retainer member 62 and wall 46 constitute means confining the upper closure head to movement within the mounting chamber.

Formed in the periphery of valve rod 66, in that portion of the valve rod which spans base wall 46 when the rod is in its lowered position of FIG. 2, is an elongated key way or slot means port 81. Key way 81 has a length in excess of the width of wall 46. With the valve rod occupying the lowered position of FIG. 2, the ends of key way 81 are exposed, one to the cavity defined by wall 51 and one to the interior of leg 12 (through an annular space 80 and a bore 82 as best seen in FIG. 1). Thus in the lowered position of the valve element and upon expansion of the expansion chamber, key way 81 constitutes a discharge port of a bleeder valve mechanism.

Extending through wall 51 at a point spaced upwardly of wall 46 is a passage 83 connecting with the central bore of a fitting 84. This passage constitutes a signal passage, and may be connected either to a whistle or to an air-actuated mechanism such as a diaphragm-actuated electric switch or the like. When the valve element is in its lowered position, air flows upwardly from leg 12 through passage 83 and fitting 84 and thence to the appropriate signal device connected to the fitting. The key way and passage 83 constitute part of an indicator means for indicating the position of the valve element 26, since they provide for the flow of air actuating the whistle when the valve element reaches its lowered position.

Explaining the operation of the valve, during use of the valve fitting 77 may be connected to a conventional air supply and exhaust means, constructed to enable air selectively either to be supplied to or exhausted from the expansion chamber of the valve, as regulated by an operator. Assuming, for purposes of explanation, that the valve is in the position shown in FIG. 1, and that it is desired to position the valve in the position shown in FIG. 2, air under pressure is supplied the expansion chamber through passage 76 (by proper regulation of the air supply and exhaust means), and this air exerts a pressure on the end 28 that moves the valve element downwardly, against the biasing action of spring 61, until further movement is prevented by retainer member 62 striking the upper face of wall 46. With the valve in the position of FIG. 2, some air escapes from port 81, that is used to actuate mechanism such as a whistle, indicating that the valve element is in its lowered position. The escape of air, however, is only slight, and not so great as to cause appreciable reduction in the pressure of air acting on the upper face of end 28. The pressure of air in the expansion chamber is still great enough to overcome the bias of spring 61. The valve thus is held in its lowered position, by the continued supply of air under pressure to the expansion chamber. When it is desired to shift the valve element to the raised position shown in FIG. 1, the air supply and exhaust means is regulated so that the supply of air to the expansion chamber through passage 76 is stopped, and air within the chamber may flow out of and be exhausted from the chamber through passage 76. This removes pressure from the top face of end 28, enabling spring 61 to return the valve element to the position of FIG. 1.

The configuration of valve element 26 is of particular importance, both in that it enables cleaning of the valve, and in that it offers minimal disturbance to fluid flowing between passages 18a, 18b, either when the valve element is in a raised or lowered position.

The sides of the valve element may be readily cleaned with the element in the lowered position of FIG. 2. To clean the base of the valve element, as well as the inner walls of leg 12, the valve element is raised to the position of FIG. 1. In this position, a cleaning fluid introduced into the conduit system controlled by the valve can swirl up around the lower closure head of the valve element and into the interior of leg 12. In this position there is no portion of the valve formerly exposed to the primary fluid handled which cannot be cleaned.

The valve may be used in various combinations. For instance, one of the legs of a similar valve corresponding to legs 11, 13 or 14 could be connected to one of the legs 11, 13 or 14 of the illustrated valve in the regulation of a more complex conduit system. When used in the milk transport system of a dairy, cleaning of the lines is accomplished in a fraction of the time previously expended for this purpose.

It is claimed and desired to secure by Letters Patent:

1. A fluid distribution valve comprising a valve casing, said valve casing having wall portions defining an elongated fluid passage and a valve mounting chamber communicating at one end with said fluid passage, said casing having a wall portion closing the other end of said mounting chamber, said wall portion having a bore extending therethrough, a valve element slidably mounted in said mounting chamber having a closure head at one end spaced away from said wall portion for opening and closing said fluid passage, an elongated rod portion connected to said other end of said valve element extending through said bore, said rod portion having a slot means formed therein spaced from said other end of said valve element, said slot means extending along the length of said rod portion a distance in excess of the width of said wall portion, air pressure means connecting with the interior of said mounting chamber for urging said valve element in one direction to a position wherein said slot means spans the distance between the two faces of said wall portion, and means for urging said valve element in the opposite direction.

2. A valve construction comprising valve casing means having walls defining a pair of fluid passages angularly disposed one to the other and connecting with each other at a joint, said valve casing means also having a wall defining a mounting chamber aligned with one of said fluid passages and communicating at one end of the chamber with the joint between said passages, said mounting chamber forming an extension of said one fluid passage, an elongated valve spool body of hourglass configuration having one end in said mounting chamber and its other end in said one fluid passage in one position of the valve spool body, said valve spool body having a stem portion interconnecting its ends of smaller cross section than the ends of the body, sealing means encircling each of the ends of said valve spool body with its said one end sealed to the wall of and closing off said mounting chamber and its said other end sealed to the wall of and closing off said one fluid passage in said one position of the valve spool body, said valve spool body being slidably mounted in said mounting chamber and said mounting chamber having a length sufficient to enable said valve spool body to be retracted within said chamber to another position where said other end of the valve spool body lies in said joint and away from said one end of the mounting chamber, and means confining movement of said valve spool body between its said one and said other positions.

3. A valve construction comprising valve casing means having walls defining a pair of fluid passages angularly disposed one to the other and connecting with each other at a joint, said valve casing means also having a nonperforate cylindrical wall defining a mounting chamber aligned with one of said fluid passages and communicating at one end of the chamber with the joint between said passages, said mounting chamber forming an extension of said one fluid passage, an elongated valve element with closure heads at each end and having one closure head in sealing engagement with the wall defining said mounting chamber and its other closure head in sealing engagement with the wall defining said one fluid passage in one position of the valve element, said closure heads being of relatively large cross section and said valve element having a body portion interconnecting said closure heads of smaller cross section, said valve element being slidably mounted in said mounting chamber and said mounting chamber having a length sufficient to enable the valve element to be retracted within the mounting chamber to another position where said other closure head lies in said joint and away from said one end of the mounting chamber, and means confining movement of said valve element between its said one and its said other positions.

4. A fluid distribution valve comprising a valve casing having walls defining a pair of interconnecting passages, one of said passages having end portions lying on opposite sides of the other of said passages, an elongated valve element with a length in excess of the width of said other passage mounted in said one passage and having a closure head at one end of the element in sealing engagement with the wall of one of the end portions of said one passage and other closure head at the other end of the element in sealing engagement with the wall of the other end portion of said one passage in one position of the valve element, said valve element having a stem portion connecting said two closure heads having a cross section smaller than the cross sections of said closure heads, said one end portion of said one passage having a length sufficient to enable the valve element to be retracted within it to another position for the valve element where said other closure head lies between the two end portions of said one passage, and means confining movement of said valve element between its said one and its said other positions.

5. The valve of claim 4 wherein each of said closure heads includes a ring seal encircling the closure head and providing sealing contact with the wall of the passage portion the closure head engages.

6. A fluid distribution valve comprising a valve casing, said valve casing having walls defining a pair of intersecting passages, each passage intersecting the other at a point intermediate the other's ends, whereby each passage has end portions lying on either side of the other passage, an elongated valve element with a length in excess of the width of one of said passages mounted in the other of said passages and having a closure head at one of its ends in sealing engagement with the wall of one of the end portions of said other passage and another closure head at its other end in sealing engagement with the wall of the other end portion of said other passage in one position of the valve element, said valve element having an hourglass configuration and a stem portion connecting said closure heads of smaller cross section than the cross sections of the closure heads, said one end portion of said other passage having a length sufficient to enable the valve element to be retracted within it to another position for the element where said other closure head lies between the two end portions of said other passage, and means confining movement of said valve element between its said one and its said other positions.

7. A fluid distribution valve comprising a valve casing, said valve casing having walls defining a pair of intersecting passages, each passage intersecting the other at a point intermediate the other's ends, whereby each passage has end portions lying on either side of the other passage, an elongated valve element with a length in excess of the width of one of said passages mounted in the other of said passages and having a closure head at one of its ends in sealing engagement with the wall of one of the end portions of said other passage and another closure head at its other end in sealing engagement with the wall of the other end portion of said other passage in one position of the valve element, said valve element having an hourglass configuration and a stem portion connecting said closure heads of smaller cross section than the cross sections of the closure heads, said one end portion of said other passage having a length sufficient to enable the valve element to be retracted within it to another position for the element where said other closure head lies between the two end portions of said other passage, means confining movement of said valve element between its said one and its said other positions, and means for moving said valve element between its said one and its said other position, said last-mentioned means being actuated by fluid under pressure to urge the valve element in one direction and having bias means for urging said valve element in the opposite direction.

References Cited in the file of this patent

UNITED STATES PATENTS

| | | |
|---|---|---|
| 2,205,033 | Dreyer | June 18, 1940 |
| 2,621,885 | Schmitt | Dec. 16, 1952 |
| 2,638,122 | Ludwig | May 12, 1953 |
| 2,748,750 | Altschuler | June 5, 1956 |